United States Patent
Solhusvik

(10) Patent No.: US 8,115,841 B2
(45) Date of Patent: Feb. 14, 2012

(54) METHOD, APPARATUS AND SYSTEM PROVIDING AN IMAGE SENSOR HAVING PIXELS WITH MULTIPLE EXPOSURES, DIODES AND GAIN READOUTS

(75) Inventor: Johannes Solhusvik, Haslum (NO)

(73) Assignee: Micron Technology, Inc., Boise, ID (US)

( * ) Notice: Subject to any disclaimer, the term of this patent is extended or adjusted under 35 U.S.C. 154(b) by 817 days.

(21) Appl. No.: 11/717,065

(22) Filed: Mar. 13, 2007

(65) Prior Publication Data

US 2008/0231736 A1    Sep. 25, 2008

(51) Int. Cl.
*H04N 3/14* (2006.01)

(52) U.S. Cl. .................................................... 348/294

(58) Field of Classification Search .................. 348/294
See application file for complete search history.

(56) References Cited

U.S. PATENT DOCUMENTS

| | | | | |
|---|---|---|---|---|
| 5,990,948 | A * | 11/1999 | Sugiki | 348/250 |
| 6,785,469 | B1 * | 8/2004 | Ide et al. | 396/121 |
| 7,443,427 | B2 * | 10/2008 | Takayanagi | 348/223.1 |
| 7,551,059 | B2 * | 6/2009 | Farrier | 340/300 |
| 7,616,231 | B2 * | 11/2009 | Farrier | 348/208.99 |
| 2004/0080646 | A1 * | 4/2004 | Zhao et al. | 348/302 |
| 2006/0044414 | A1 * | 3/2006 | Lee et al. | 348/230.1 |
| 2006/0103746 | A1 * | 5/2006 | Mori et al. | 348/294 |
| 2006/0181627 | A1 * | 8/2006 | Farrier | 348/308 |
| 2007/0195191 | A1 * | 8/2007 | Ide et al. | 348/345 |

* cited by examiner

*Primary Examiner* — Lin Ye
*Assistant Examiner* — Amy Hsu
(74) *Attorney, Agent, or Firm* — Dickstein Shapiro LLP

(57) ABSTRACT

A method, apparatus and system are described providing a high dynamic range pixel. Operating conditions, including integration time and sensitivity of different photosensors, and signal processing, including gain settings, are selected to provide multiple possible response curves. An output is selected from the possible response curves and used to provide an overall pixel response curve to increase the pixel dynamic range.

92 Claims, 8 Drawing Sheets

METHOD, APPARATUS AND SYSTEM PROVIDING AN IMAGE SENSOR HAVING PIXELS WITH MULTIPLE EXPOSURES, DIODES AND GAIN READOUTS

FIELD OF THE INVENTION

Disclosed embodiments relate to a method, apparatus, and system providing an image sensor capable of providing an output signal based on multiple output signals from imager pixels.

BACKGROUND OF THE INVENTION

An imager device, for example, a complementary metal oxide semiconductor (CMOS) imager device, includes a focal plane array of pixels; each cell includes a photo-conversion device, for example, a photogate, photoconductor or a photodiode overlying a substrate for producing a photo-generated charge in a doped region of the substrate. A readout circuit is provided for each pixel and includes at least a source follower transistor. The pixel also typically has a floating diffusion node, connected to the gate of the source follower transistor. Charge generated by the photo-conversion device is sent to the floating diffusion node. The imager device may also include a transfer transistor for transferring charge from the photo-conversion device to the floating diffusion node and a reset transistor for resetting the floating diffusion node to a predetermined charge level prior to charge transference.

FIG. 3 shows one conventional CMOS pixel having a four-transistor (4T) design, including a pinned photodiode photosensor 425, a floating diffusion region 420, a reset transistor 402, transfer transistor 408, source follower transistor 404, and row select transistor 406.

FIG. 1 illustrates a block diagram of a CMOS imager device 208 having a pixel array 200 where each pixel may be constructed as described above. Pixel array 200 comprises a plurality of pixels arranged in a predetermined number of columns and rows. The pixels of each row in array 200 are all turned on at the same time by a row select line, and the pixels of each column are selectively output by respective column select lines. A plurality of row and column lines are provided for the entire array 200. The row lines are selectively activated in sequence by the row driver 210 in response to row address decoder 220 and the column select lines are selectively activated in sequence for each row activated by the column driver 260 in response to column address decoder 270. Thus, a row and column address is provided for each pixel. The imager device 208 is operated by the control circuit 250, which controls address decoders 220, 270 for selecting the appropriate row and column lines for pixel readout, and row and column driver circuitry 210, 260, which apply driving voltage to the transistors of the selected row and column lines. Alternatively, multiple rows or columns may be activated at the same time if readout circuits are provided for each row or column.

The pixel output signals typically include a pixel reset signal, Vrst, taken off the floating diffusion node 420 when it is reset by reset transistor 402 and a pixel image signal, Vsig, which is taken off the floating diffusion node 420 after charges generated by photosensor 425 are transferred to it by transfer transistor 408. The Vrst and Vsig signals are subtracted by a differential amplifier 267 which produces a signal Vrst−Vsig for each pixel, which represents the amount of light impinging on the pixels. This difference signal is digitized by an analog to digital converter 275. The digitized pixel signals are then fed to an image processor 280 which performs various processing on the digital signals from the pixel array 20 to form a digital image. The digitizing and image processing can be performed on or off the chip containing the pixel array 200. The sample and hold circuitry 265 and differential amplifier are part of an analog circuit processing circuit 268.

Pixel arrays, such as that described above, as well as others employing other pixel and readout architectures, have a characteristic dynamic range. Dynamic range refers to the range of incident light that can be accommodated by the pixels in a single frame of pixel data. It is desirable to have an array with a high dynamic range to image scenes that generate high dynamic range incident signals, such as indoor rooms with windows to the outside, outdoor scenes with mixed shadows and bright sunshine, night-time scenes combining artificial lighting and shadows, and many others.

The characteristic dynamic range of a pixel is commonly defined as the ratio of its largest non-saturating signal to the standard deviation of the pixel noise under dark conditions. When the dynamic range of a pixel is too small to accommodate the variations in light intensities of the imaged scene, e.g., by having a low light saturation level, the full luminance range of the image scene is not reproduced. The illumination-output voltage profile of a conventional pixel photosensor is typically linear, as shown in FIG. 2, which illustrates an illumination v. output voltage graph of a prior art pixel photosensor. A pixel's maximum voltage Vout-max, shown as a value KP1, may be reached at a relatively low level of illumination $I_{max-1}$ which causes the pixel to be easily saturated, thus limiting dynamic range.

Pixel arrays, including CMOS pixel arrays, typically have low signal-to-noise ratios and narrow dynamic range because of their inability to fully collect, transfer, and store the full extent of electric charge generated by the photosensitive area of the photosensor in response to scene illumination. Since the amplitude of the electrical signals generated by any given pixel in a CMOS imager is very small, it is especially important for the signal-to-noise ratio and dynamic range of the pixel to be as high as possible. Generally speaking, these desired features are not readily attainable, however, in a conventional four-transistor pixel without undesirably increasing the size of the photosensor, and hence size of the pixel. Therefore, there is a need for an improved pixel array and associated pixel signal processing for use in an imager device that provides high signal to noise ratio and high dynamic range while maintaining a small pixel size.

DETAILED DESCRIPTION OF THE INVENTION

Figure 1:
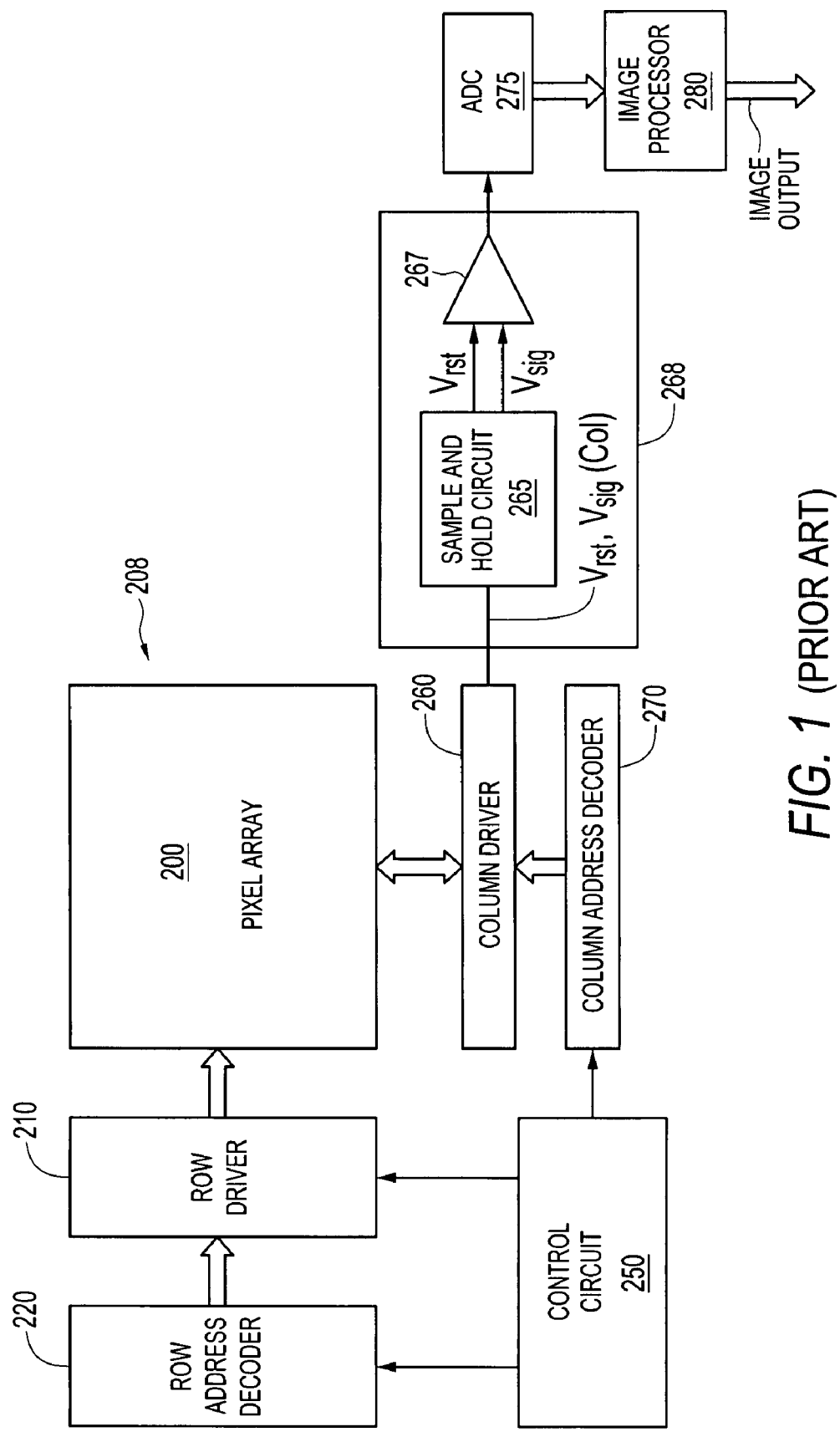
FIG. 1 is a block diagram of a conventional CMOS imager.
Figure 2:
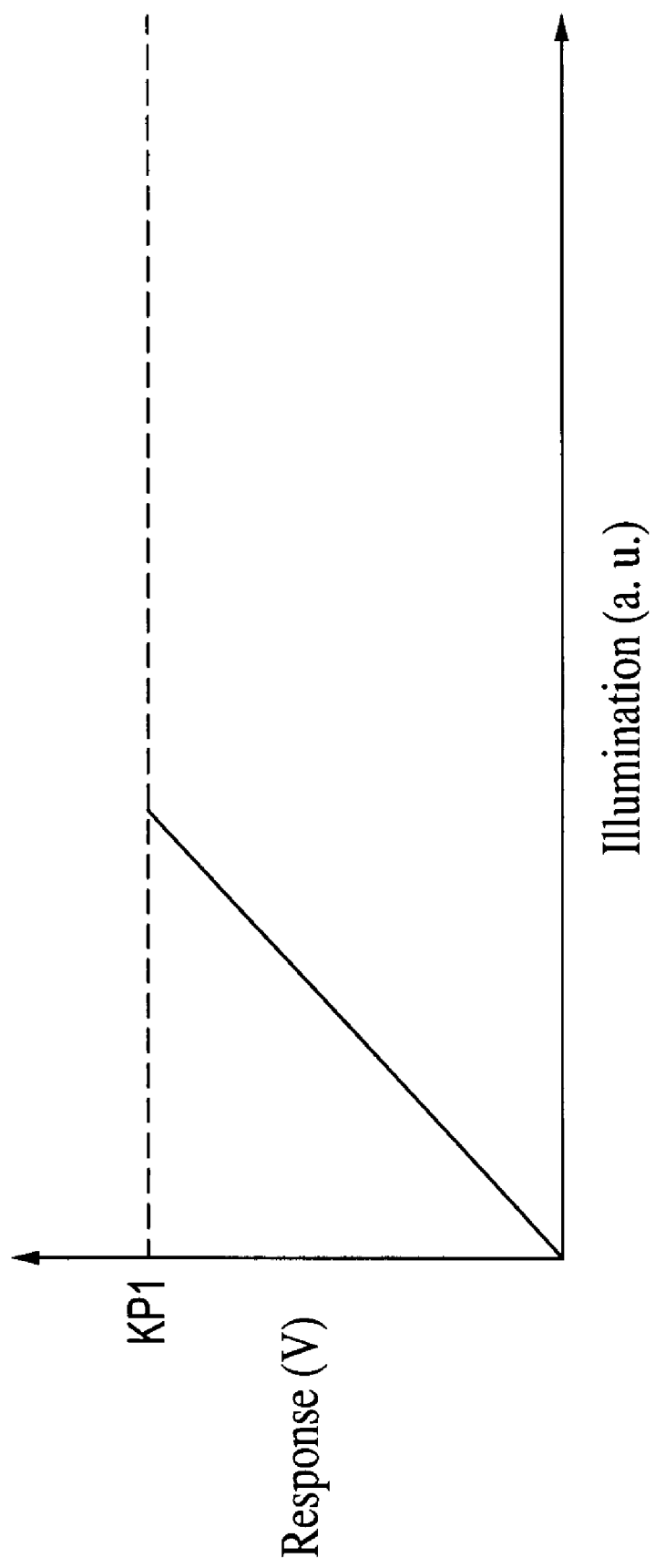
FIG. 2 is an illumination v. response graph of a conventional pixel.

In the following detailed description, reference is made to the accompanying drawings, which form a part hereof and illustrate specific embodiments in which the present invention may be practiced. In the drawings, like reference numerals describe substantially similar components throughout the several views. These embodiments are described in sufficient detail to enable those skilled in the art to practice the present invention, and it is to be understood that other embodiments may be utilized, and that structural, logical and electrical changes may be made without departing from the present invention.

The term "substrate" is to be understood as including silicon, silicon-on-insulator (SOI), or silicon-on-sapphire (SOS) technology, doped and undoped semiconductors, epitaxial layers of silicon supported by a base semiconductor foundation, and other semiconductor structures, as well as insulating substrates, such as quartz or glass having a semiconductor foundation. Furthermore, when reference is made to a "substrate" in the following description, previous process steps may have been utilized to form regions or junctions in the base semiconductor structure or foundation. In addition, the semiconductor need not be silicon-based, but could be based on silicon-germanium, germanium, or gallium-arsenide.

The term "pixel" refers to a picture element unit cell containing a photosensor device and other devices for converting electromagnetic radiation to an electrical signal. For purposes of illustration, a representative CMOS pixel is illustrated in the figures and description herein, and typically fabrication of all pixels in a pixel array of an image device will proceed simultaneously in a similar fashion. It should be understood that embodiments of the invention also encompass other solid state imagers and associate pixels, as well as CMOS.

Embodiments disclosed herein provide a method, apparatus and system providing a pixel array and associated circuitry which achieves pixel output signals having high dynamic range. In one embodiment, a number of different pixel outputs are captured for each pixel under different operational conditions during a frame capture cycle. One of the number of possible outputs is selected for each pixel in accordance with a selection criteria, which may include, for example, signal-to-noise ratio or the level of light illumination impinging upon the pixel, e.g. whether or not a pixel is saturated. As an example, at a low illumination level, pixel output signal may be selected corresponding to an operational setting that is highly sensitive to light and optimal for low illumination. As another example, at a high illumination a pixel output signal may be selected corresponding to a setting that is less sensitive to light, hence optimal for high illumination. Accordingly, a pixel output signal produced through a selection of possible outputs achieves a pixel output signal having an extended dynamic range.

The operational settings which can be varied during a frame cycle include selecting different elements within the pixel for photo-conversion and changing the integration time. After a pixel output signal is produced, operational settings which can be varied include selective application of a gain to amplify the pixel output signal.

Figure 3:
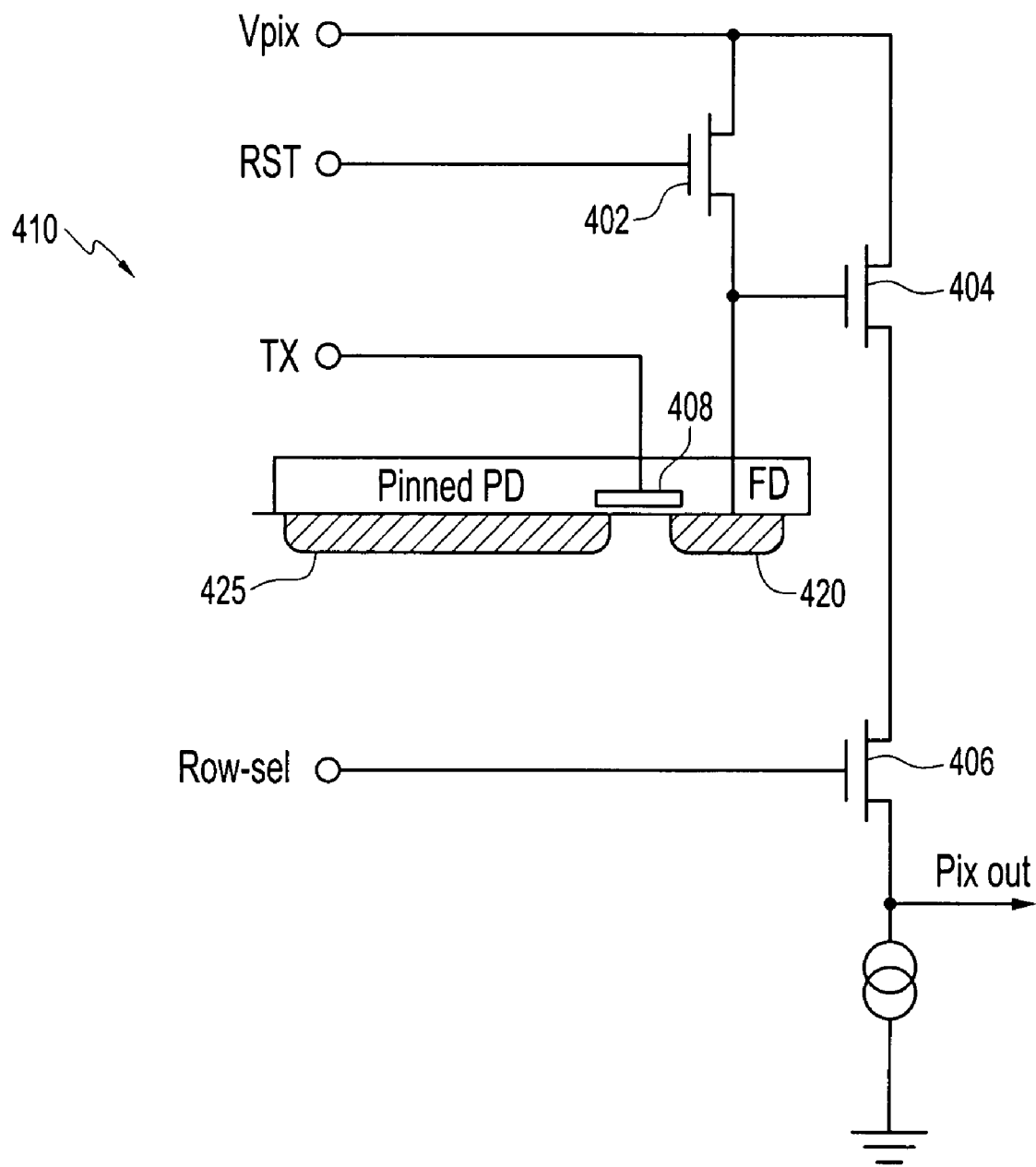
FIG. 3 is a schematic diagram of a conventional four-transistor pixel.

The operational settings as described above may be controlled without modifying the pixel architecture itself, thereby maintaining state-of-the-art performance in terms of sensitivity and noise while enabling small-pixel (low-cost) implementations of higher dynamic range sensor products. FIG. 3 shows a conventional four-transistor (4T) pixel 410 which may be used in disclosed embodiments. Pixel 410 includes a pinned photodiode photosensor 425, a reset transistor 402, a source follower transistor 404, a row select transistor 406, a transfer transistor 408 and a floating diffusion region 420, as described above.

One operational setting is a selection between two photo-conversion devices within a pixel 410. Normally, in a conventional four transistor pixel architecture shown in FIG. 3, only the photodiode 425 generates an incident light image signal. However, the floating diffusion region 420 is also a diode and therefore also collects charges when exposed to light. In a conventional pixel 410, the floating diffusion region 420 is blocked from sensing light or, if not blocked, any light sensing signal is lost through a reset process. However, in embodiments of the invention, the floating diffusion region 420 is exposed intentionally to image light and the signal produced is captured and processed. Thus, in disclosed embodiments pixel 410 may accumulate charge through at least two different photosensor elements, pinned photodiode (PD) 425 and floating diffusion region (FD) 420. Pixel 410 is a 4T pixel, but other types of pixels having at least four transistors and a diode floating diffusion region 420 may also be used in embodiments of the invention.

Figure 4:
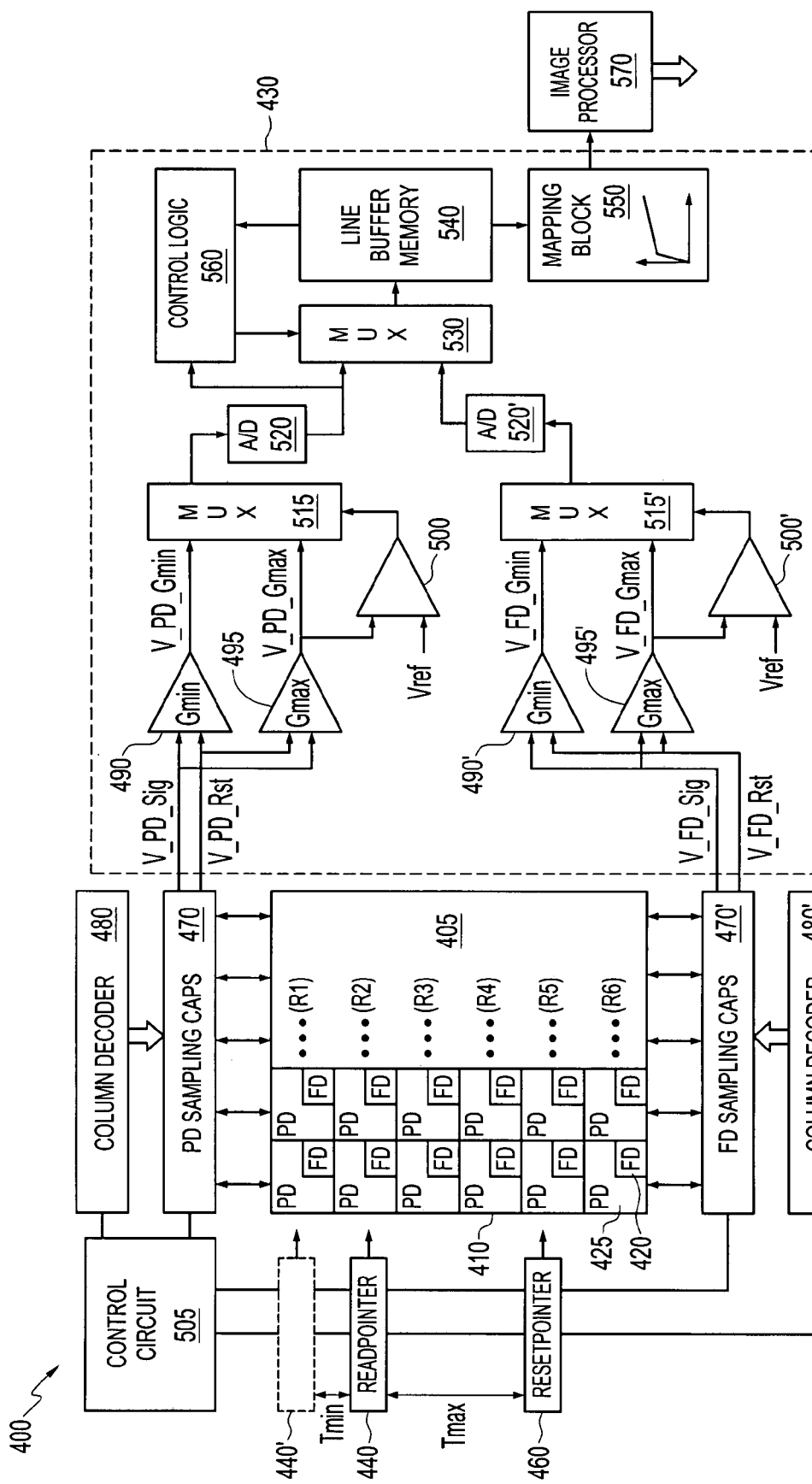
FIG. 4 is a block diagram of an imaging device according to an embodiment of the disclosure.

FIG. 4 shows an imaging device 400 including a pixel array 405 according to a disclosed embodiment. Pixel array 405 includes both photosensor, e.g. photodiode 425 signal sampling capacitors in sampling circuit 470, and floating diffusion region 420 signal sampling capacitors in sampling circuit 470'. Pixels 410 in pixel array 405 (only six rows are shown for simplicity) are selectively accessed by rows by the row read pointer 440 and the activation of column select lines for each row by the column drivers 480, 480' in response to column address decoders 470, 470'. A pixel processing peripheral circuitry 430 is also illustrated and will be described further below.

In conventional operation of a four transistor pixel 410, any charge accumulated in floating diffusion region 420 through the photoelectric effect is normally lost in the pixel readout process when the floating diffusion region 420 is reset during a correlated double sampling operation. Instead of discarding this charge, the embodiment shown in FIG. 4 includes circuitry to sample, hold and use the incident light charge collected by floating diffusion region 420. Preferably the charge is sampled using a technique called double delta sampling (DDS). Double delta sampling is similar to a conventional correlated double sampling process (CDS) used for pixel signal sampling. In both methods two respective samples of a reset and image signal are taken which are combined to provide a differential output. In double delta sampling, however, the reset value is taken after the image signal value as opposed to being taken before the image signal value, as is done in correlated double sampling. Consequently, the kTC noise associated with the sampled reset signal does not correlate with the kTC noise from the sampled image signal value (the amount of kTC noise will differ with each reset), thus kTC noise is not subtracted out in double delta sampling. However, fixed pattern noise, which is primarily dependant upon unchanging physical attributes of the pixel 410, can still be removed through this technique.

Figure 5:
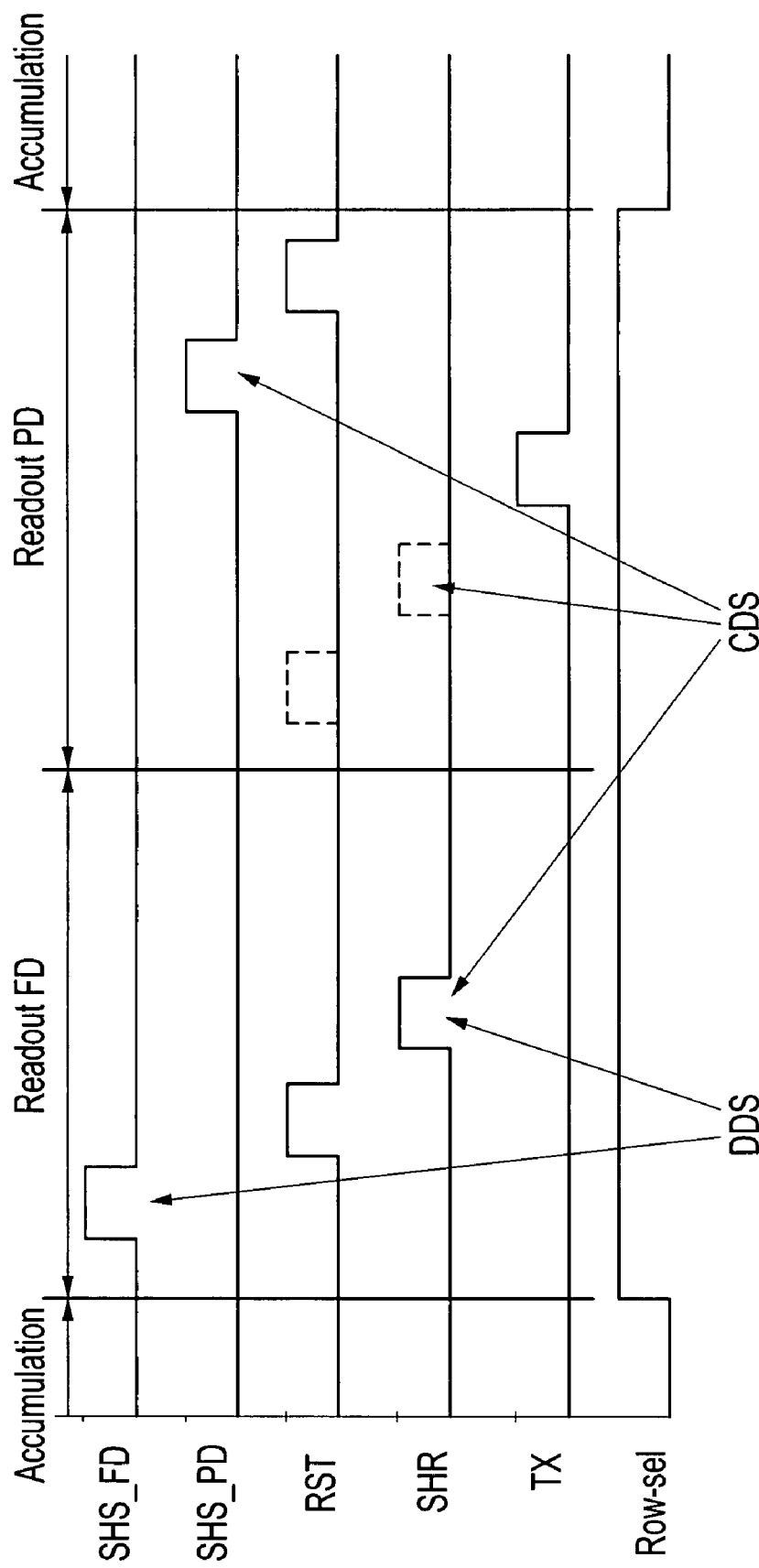
FIG. 5 is an illumination v. response graph of a pixel output which may be generated by the FIG. 4 circuit showing multiple response curves.

FIG. 5 shows a signal timing diagram for operating each pixel 410 of array 405 to readout the floating diffusion region 420 signal using double delta sampling and the photodiode 425 signal using correlated double sampling. A row select (Row_Sel) signal is applied to the gate of row select transistor 406. Next, charge which is accumulated in the floating diffusion region 420 in response to light from an image prior to the time the row select transistor 406 is enabled and which has accumulated at floating diffusion region 420 is sampled by a SHS_FD pulse. This sampling causes an output signal produced by source follower transistor 404 by charge on the floating diffusion region 420 to be sampled by a sample and hold capacitor in the sampling circuit 470'. The floating diffusion region 420 is then reset by a pulse RST applied to the gate of reset transistor 402.

The floating diffusion region 420 reset level produces an output signal at the source follower transistor 404 which is sampled and held by one or two capacitors in sampling circuit 470' in response to a SHR pulse. According to one embodiment, the floating diffusion reset level could be stored on two separate capacitors. The floating diffusion region 420 reset level serves a dual purpose. First, it is subtracted from the stored signal value of the floating diffusion region 420 to complete the double delta sampling of the floating diffusion region 420, and second, it serves as the reset value of the floating diffusion region 420 for the subsequent correlated double sampling of the photodiode 425. Thus, storing the floating diffusion reset value on two separate capacitors bypasses the need to sample the floating diffusion reset value twice and may thereby save processing time.

Image light charge accumulates in the photodiode up to the time a pulse TX is applied to the gate of the transfer transistor 408 which then transfers the charge accumulated in the photodiode 425 to the floating diffusion region 420. Finally, a SHS_PD pulse samples the output signal of source follower transistor 404 produced by the charge from the floating diffusion region 420 to a capacitor in sampling circuit 470. The image signal value is subtracted from the reset signal value in sample circuit 470 to produce a correlated double sampling of photodiode 425. A pulse RST is applied to the gate of reset transistor 402 to reset the floating diffusion region 420 prior to the initiation of another accumulation period.

The photodiode 425 has a larger surface area and is better optimized to function as a photosensor than the floating diffusion region 420. The quantum efficiency and signal to noise ratio of the photodiode 425 are therefore better compared to the quantum efficiency and signal to noise ratio of floating diffusion region 420, resulting in a higher output response to identical light exposure. The sensitivity of the photodiode 425 may be adjusted, for example, by providing less surface area for receiving light or using a filter, to lessen the difference in efficiency between the photodiode 425 and the floating diffusion region 420, if desired. Accordingly, at least two different image signal outputs are possible by controlling and sampling signals produced by charges accumulated by the photodiode 425 and floating diffusion region 420 as described.

The RST, Row_Sel and TX signals discussed above with respect to FIG. 5 for a single pixel readout are supplied by the control circuit 505 of FIG. 4 which produces these signals on a row-by-row basis using reset pointer 460 to generate initial reset signals for all pixels of a row and a read pointer, e.g., READPOINTER 440 for subsequently designating a row for application of the RST, Row_Sel and TX signals for all pixels of the row. Control circuit 505 also generates the SHR and SHS signals used to sample the pixel signals onto sampling capacitors in sampling circuits 470 and 470'.

Additional pixel outputs may be obtained by accumulating charge in the photodiode 425 and floating diffusion 420 for multiple integration times during a single frame capture cycle. The embodiment illustrated in FIG. 4 employs a row readpointer READPOINTER 440 in a type of rolling shutter readout to provide multiple integration times. It should be noted that pixel array 405 is illustrated as having six rows of pixels for convenience and illustrative purposes only. This number of rows is not intended to be limiting; a typical pixel array may have hundreds or thousands of rows as is known in the art. Rows R1, R2, R3, R4, R5, and R6 in pixel array 405 are selectively addressed by row driver circuitry under control of the row readpointer READPOINTER 440. The row pointer 440 may be implemented in any of various ways known in the art, for example, as registers storing row addresses.

Execution of a rolling shutter readout begins with a given row first being reset by reset pointer 460. After reset, all pixels of a reset row begin integrating charge in both the photodiode 425 and floating diffusion region 420. Row pointer READPOINTER 440 addresses a row previously reset by reset point 460, for example, row R1, for readout at a time Δt, Tmax, after having been reset by reset pointer 460. The pixels are read out and simultaneously reset again (RST, FIG. 5) during the readout. As described above, during row readout both a floating diffusion region image signal and a photodiode image signal, each represented as a reset level from which an image level is subtracted, are acquired from each pixel of the row. The values obtained from the photodiode image signal and the floating diffusion region image signal are stored in the line buffer memory 540. During the readout after the first selection by READPOINTER 440, the read out pixels resume accumulation of charge subsequent to being sampled. Upon the completion of the readout of R1, READPOINTER 440 selects a next row for readout depending upon a desired minimum integration time Δt, Tmin.

The shortest minimum integration time Tmin possible is obtained by selecting the same row for a second readout by READPOINTER 440. By selecting the same row for readout, pixels integration time is limited to the length of time required to readout the single row. Accordingly, for the shortest minimum integration time Tmin, the next row selected for readout by READPOINTER 440 after R1 is R1 again. Subsequently, READPOINTER 440 progresses to select the next row for maximum integration time Tmax readout, in this case, R2. Pixels in R2 accumulate charge until they are selected for read out a second time, a minimum integration time Tmin later, and so on.

To provide a minimum integration time Tmin corresponding to a two-row delay, a rolling shutter readout begins with a given row first being reset by reset pointer 460 as described above. Row pointer READPOINTER 440 addresses a row previously reset by a reset point 460, for example, row R1, for readout at a time Δt, Tmax. The pixels are read out and simultaneously reset again (RST, FIG. 5) during the readout. READPOINTER 440 selects a second row for Tmax readout, for example, R2, after the readout after the first selection. During the readout of R2, pixels in R1 continue to accumulate charge. A two-row delay between a first selection for readout by READPOINTER 440 and a second selection for readout for READPOINTER 440 is provided by selecting R1 for readout by READPOINTER 440 next. Pixels in R1 would have accumulated charge during the readout of pixels in R2, corresponding to a two-row (R1 and R2) delay integration time. Subsequently, READPOINTER 440 will progress to select the next row for maximum integration time Tmax readout, in this case, R3. Pixels in R2 accumulate charge until they are selected for read out a second time, a minimum integration time Tmin later after the readout of pixels in R3, and so on.

In the above described readout, the length of time Δt for minimum integration, Tmin, may be easily adjusted by changing the number of rows between the first selection and second selection. The length of time Δt for maximum integration time, Tmax, may be adjusted by changing the number of rows between the reset pointer 460 and the first selection by READPOINTER 440.

In the case where the first selection for readout and the second selection for readout are the same, the time Δt represents the minimum integration time, Tmin, that pixels 410 in pixel array 405 can accumulate charge. In the case where the first selection for readout and the second selection for readout are separated by one row, the time Δt represents a minimum integration time, Tmin, corresponding to a single row delay, as read out upon the second selection by READPOINTER 440'. Correspondingly, pixels read out upon the first selection by READPOINTER 440 accumulate charge for a maximum amount of time, Tmax, equal to the length of time required to cycle through all rows of pixel array 405. Although a single row pointer READPOINTER 440 is described, two adjacent readout row pointers or additional row pointers may be used and spaced a number of rows apart to provide varying integration times. In the embodiment illustrated, Tmax is limited by using a reset pointer RESETPOINTER 460. RESETPOINTER 460 could be implemented and operated similar to READPOINTER 440 with the primary difference being that its function is to reset rows prior to these rows being addressed for readout by READPOINTER 440, thereby shortening the maximum integration time Tmax. Rows addressed by RESETPOINTER 460 are reset only and not read out. If a larger Tmax is desired, the row spacing between RESETPOINTER 460 and the READPOINTER1 440 can be increased. The longest time Δt possible for Tmax can be obtained by eliminating the use of RESETPOINTER 460 entirely.

By appropriately operating the row pointers 440, 460, two different integration times are provided, Tmax and Tmin. For each of the pixel output signals PD and FD of pixel array 405, there are accordingly two different associated integration times, yielding four pixel output signals: PD-Tmax, PD-Tmin, FD-Tmax, and FD-Tmin.

Turning now to the periphery circuitry 430 shown in FIG. 4, periphery circuitry 430 includes amplifiers 490, 490', 495, 495' comparators 500, 500' multiplexers 515, 515' analog-to-digital converters 520, 520', multiplexer 530, control logic circuit 560, line buffer memory 540 and mapping block 550. Amplifier 490, comparator 500, multiplexer 515 and analog-to-digital converter 520 process signals V_PD_Sig and V_PD_Rst which represent the reset and photodiode pixel signal values of a given pixel. Amplifier 490', comparator 500', feedback capacitor 510' and analog to digital converter 520' process pixel signals V_FD_Sig and V_FD_Rst which represent the reset and floating diffusion pixel signal values of a given pixel. Depending upon the desired readout sequence, the periphery circuitry 430 can be constructed differently.

In the illustrated embodiment, amplifiers 490, 495 receive the pixel output signals, V_PD_Sig, V_PD_Rst and output a signal V_PD which represents the difference between the two signals with either a minimum or a maximum gain applied. Amplifiers 490', 405' receive the pixel output signals V_FD_Sig and V_FD_Rst and output a signal V_FD which represents the difference between the two signals with either a minimum or a maximum gain applied. The gain applied to the signals V_PD and V_FD by amplifiers 490, 490' may be either a minimum gain Gmin or maximum gain Gmax, selected by multiplexer 515, 515' based on the output of comparator 500, 500'. The amplified signals are passed through analog-to-digital converters 520, 520' for conversion to digital signals. The digitized signals are sent to multiplexer (MUX) 530. Control logic circuit 560 controls multiplexer 530 and receives the digitized photodiode signal V_PD for use in determining which signal, V_PD or V_FD, is selected by multiplexer 530 for storage in the line buffer memory 540. A mapping block 550, which may be implemented using a look-up table or other means, processes the output from the line buffer memory 540 and produces a final pixel output signal which is provided to an image processor 570.

The rolling shutter readout with two integration times Tmax and Tmin combined with accumulating charge through either photodiode 425 or floating diffusion 420 and applying at least two different gains provides eight different combinations of operating conditions and processing settings:

1. PD+Tmax+Gmin
2. PD+Tmax+Gmax
3. FD+Tmax+Gmin
4. FD+Tmax+Gmax
5. PD+Tmin+Gmin
6. PD+Tmin+Gmax
7. FD+Tmin+Gmin
8. FD+Tmin+Gmax It should be understood that the eight combinations provided above are not intended to be limiting. Different or additional operating conditions or signal processing can be applied to provide a higher or lower number of combinations as needed.

Figure 7:
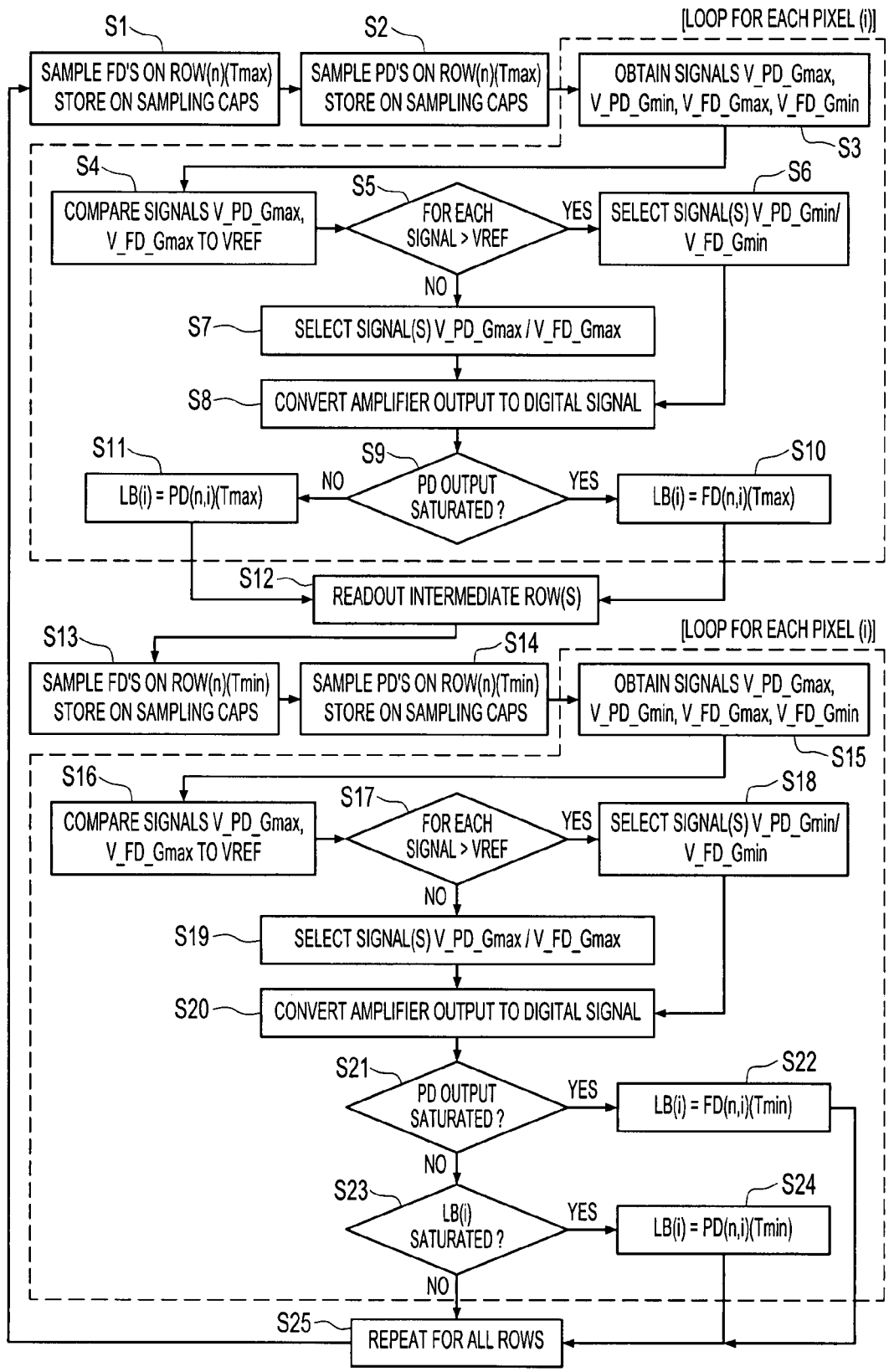
FIG. 7 is a readout timing diagram according to the FIG. 4 embodiment.

Various algorithms may be implemented to select which operating condition pixel output values are stored as the final pixel output. FIG. 7 shows a flowchart of one exemplary algorithm for selecting a final pixel output. The algorithm described is only an example and is not intended to be limiting in any way. Numerous algorithms could be implemented utilizing a wide variety of selection criteria.

Referring to the flowchart of FIG. 7, in step S1 all floating diffusion regions 420 in a given row(n) addressed by READPOINTER 440 are sampled, having accumulated charge for the maximum integration time Tmax. The sampled values are stored in the floating diffusion sampling capacitors 470'. Next, all floating diffusion regions 420 are reset, photodiodes 425 in the same row(n) are sampled and the values are stored in the photodiode sampling capacitors 470. After the photodiodes 425 are sampled, the floating diffusion regions 420 are reset again. In step S3 the amplifiers 490, 495 receive signals V_PD_Sig and V_PD_Rst and provide signals V_PD_Gmin and V_PD_Gmax as amplifiers 490', 495' receive signals V_FD_Sig and V_FD_Rst and provide signals V_FD_Gmax and V_FD_Gmin. Step S3 also marks the initial step of a loop through all pixels (i) which functions to select and store a temporary first value for each pixel. The V_PD_Gmax and V_FD_Gmax signals are each compared to a reference voltage Vref in steps S4 and S5. As can be seen in FIG. 4, this process operates in parallel for the two signals, identical circuitry being provided to provide and compare the signals simultaneously. In step S5, for each signal V_PD_Gmax or V_FD_Gmax greater than the reference voltage Vref, step S6 is executed and the comparator 500,500' selects the V_PD_Gmin/V_FD_Gmin signal(s). For each signal V_PD_Gmax or V_FD_Gmax less than the reference voltage Vref, step S7 is executed and the comparator 500,500' selects the V_PD_Gmax/V_FD_Gmax signal(s). The resulting signals, having either a high or low gain applied, are next received by the analog-to-digital converters 520, 520' and converted to digital signals in step S8. The converted photodiode signal is checked against another reference value by control logic 560 to determine whether the signal is above a saturated level in step S9. If the signal is determined to be saturated, step S11 will be executed and the control logic 560 will operate multiplexer 530 to pass the floating diffusion signal on to line buffer memory 540 for storage. If the signal is not saturated, step S9 will be executed and the photodiode signal will be stored in line buffer memory 540. At this point the process of determining which Tmax value is stored in line buffer memory 540 begins again at step S3 for the next pixel (i+1). The loop is repeatedly executed cycling through all pixels of a row to store a value corresponding to one of the following possible operating condition combinations for each pixel:
1. PD+Tmax+Gmin
2. PD+Tmax+Gmax
3. FD+Tmax+Gmin
4. FD+Tmax+Gmax After all pixels of a row are processed, READPOINTER 440 selects a number of intermediate rows for Tmax readout (as described above) in step S12, storing the values in line buffer memory 540. The number of intermediate rows that are read out determines the length of time Δt for the minimum integration time Tmin are read out. For example, reading out a single intermediate row results in a relatively short Tmin. Row pointer READPOINTER 440 returns to select row(n) a second time in step S13 for Tmin readout once all intermediate rows have been readout. The floating diffusion regions 420 in row(n) are sampled, having accumulated charge now for the minimum integration time Tmin. The values are stored in the floating diffusion sampling capacitors 470'. Next all photodiodes 425 in row(n) are sampled again in step S14 and the values for the minimum integration time Tmin are stored in the photodiode sampling capacitors 470. The difference signals of reset minus floating diffusion signal are taken to produce V_FD_Gmin and V_FD_Gmax, while the difference signal of reset minus photodiode signal are taken to produce V_PD_Gmin and V_PD_Gmax in step S15. Step S15 marks the initial step of a second loop through all pixels to select a second temporary value to check against the value currently stored in the line buffer memory for each pixel.

The amplified V_PD_Gmin, V_PD_Gmax, V_FD_Gmin and V_FD_Gmax signals are respectively compared to a reference voltage Vref in step S16. If the corresponding amplifier output is greater than the reference voltage, then step S18 is executed and the comparator 500' selects the V_PD_Gmin/V_FD_Gmin signal(s). If the corresponding amplifier output is less than the reference voltage, then step S19 is executed and the comparator 500' selects the V_PD_Gmax/V_FD_Gmax signal(s). The resulting signals, having a high or low gain applied, are received by the analog-to-digital converters 520, 520' and converted to digital signals in step S20. The converted photodiode signal is then checked against a reference value by control logic 560 to determine whether it is above a saturated level in step S21. If the signal is determined to be saturated, step S22 will be executed and control logic 650 will control multiplexer 530 to pass the floating diffusion signal on to line buffer memory 540 for storage, replacing the previously stored value for the pixel. If the photodiode signal is not saturated, step S23 is executed and the currently stored value in the line buffer memory is checked to determine whether it was saturated. If a saturated value was stored, step S24 is executed and the photodiode signal will be stored in the line buffer memory in place of the previously stored value.

Beginning with step S15, the process of checking the Tmin sampled values against the stored Tmax values then restarts until all pixels of a row have been checked. After all pixel values in row(n) have been checked, line buffer memory will contain a final selected output value for each pixel in row(n). Thus, after the loop beginning at step S15 and ending at steps S22, S24 is executed, one of the eight operating conditions identified in paragraph 37 above is stored for each pixel of a row(n) in line buffer memory 540. In addition, the system control logic 560 stores a value indicating which of the eight signals (1) ... (8) above was used for each pixel output signal of a row.

Figure 6:
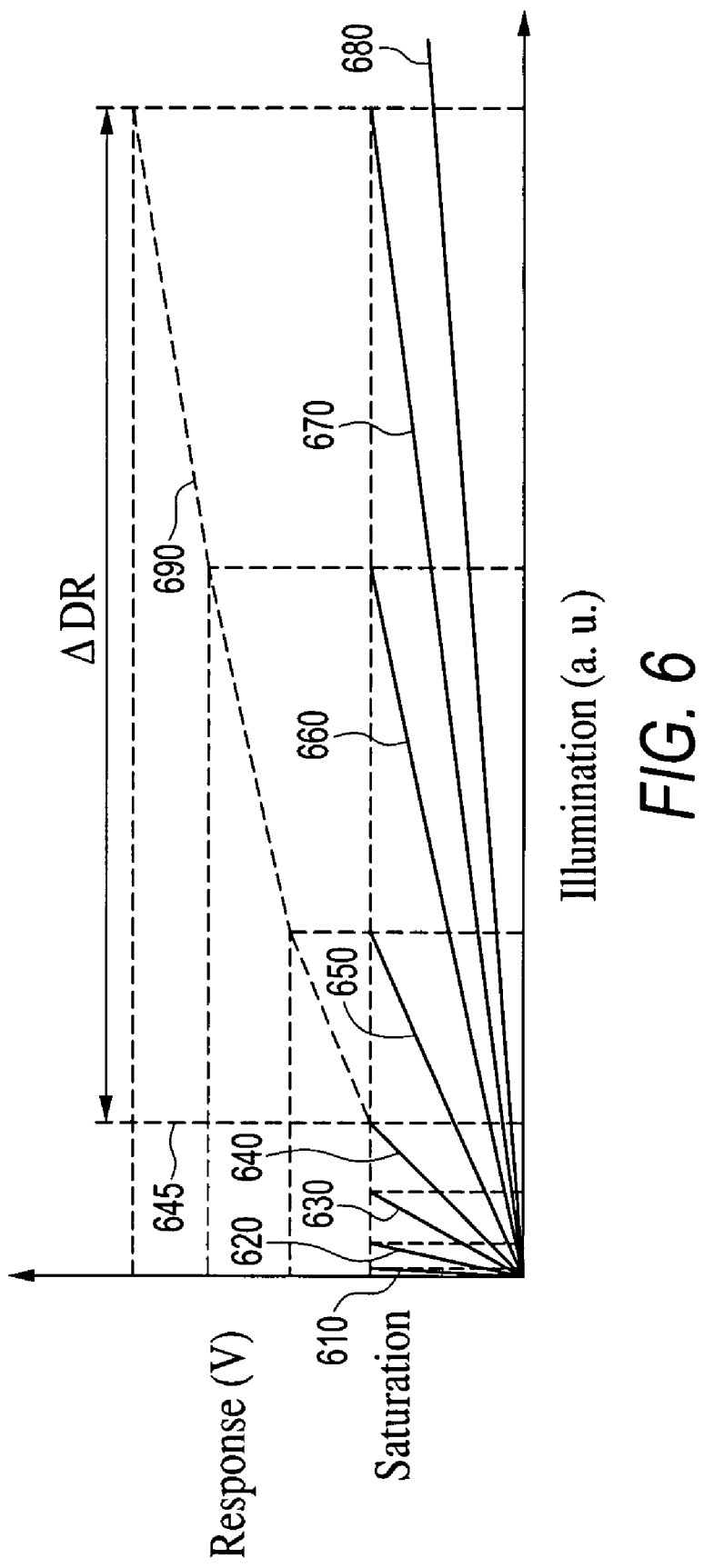
FIG. 6 is a flowchart of an algorithm for building final pixel outputs according to the FIG. 4 embodiment.

Referring back to FIG. 4, the stored values in the line buffer memory 540 are passed to the mapping block 550. Mapping block 550 maps the stored pixel values to an appropriate non-linear pixel response output according to a desired curve shape. FIG. 6 shows illumination input vs. pixel response output for eight operating condition combinations corresponding to eight possible pixel operating condition values. The algorithm described above is used to select a pixel value on a segment of each of the linear output lines for storage in line buffer memory 540. Mapping block 550 then remaps, using information on which of the eight operational conditions produced the output signal, the pixel values with the selected segments to form a pixel response output curve 690 having an extended dynamic range. As illustrated, outputs corresponding to conditions that produced the individual response curves 640, 650, 660, and 670 are mapped to form a final output curve 690. Compared to a conventional readout of a pixel under single set of operating conditions, represented by the extended line 640, the dynamic range of the pixel response curve 690 is extended by DR.

The response curve 690 is an approximation of a logarithmic curve; however, other types of response curves could be formed, for example, an extended linear output of any output curve corresponding to a particular set of operation conditions. An extended linear output could be calculated by mapping block 550 for any single curve by using the known values of the output slope of the curve and input illumination level, which may be detected in other operating conditions. For example, light detection in the setting corresponding to curve 640 is limited to illumination up to line 645. However, light may be detected beyond that range in other operating conditions, such as those corresponding to curves 650, 660, and 670. Accordingly, the input light detected at operating conditions corresponding to curve 660 may be mapped to calculate an output equal to the linear output of curve 640 at illumination levels beyond line 645.

The criteria upon which the output selection is based could be, for example, signal-to-noise ratios, where output corresponding to a different set of operating conditions is selected at the illumination levels at which a the output achieves a minimum signal-to-noise ratio.

Figure 8:
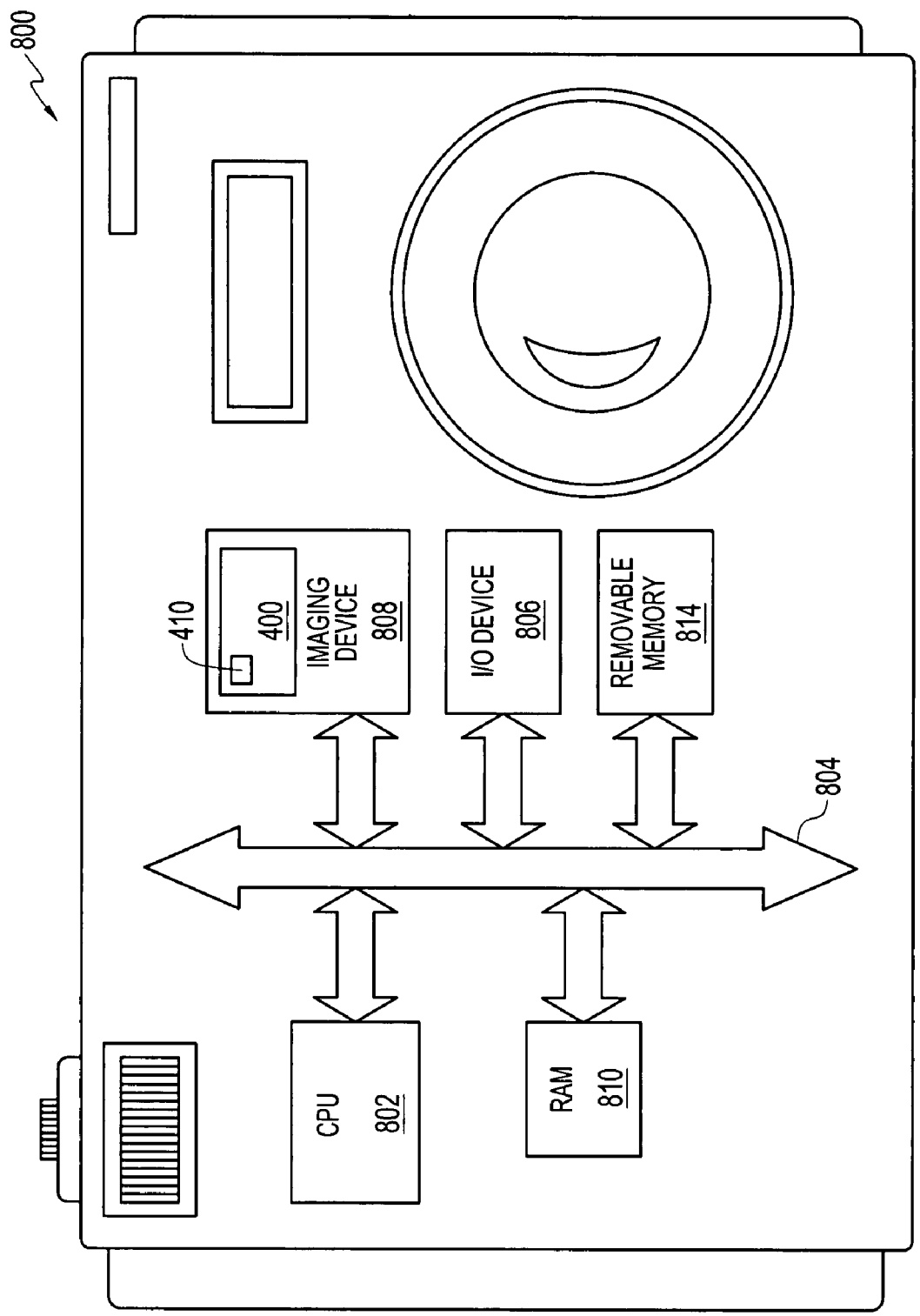
FIG. 8 is a processor system, e.g. a digital camera system, in an embodiment of the disclosure.

FIG. 8 shows an image processor system 800, for example, a still or video digital camera system, which includes an imaging device 400 employing pixels 410. The imager device 400 may receive control or other data from system 800. System 800 includes a processor 802 having a central processing unit (CPU) that communicates with various devices over a bus 804. Some of the devices connected to the bus 804 provide communication into and out of the system 800; one or more input/output (I/O) devices 806 and imager device 400 are such communication devices. Other devices connected to the bus 804 provide memory, illustratively including a random access memory (RAM) 810, and one or more peripheral memory devices such as a removable memory drive 814. The imager device 400 may be constructed as shown in FIG. 4 with the pixel array 405 having pixels 410. The imager device 400 may, in turn, be coupled to processor 802 for image processing, or other image handling operations. Examples of other processor based systems describe a camera system, which may employ the imager device 400, include, without limitation, computer systems, camera systems, scanners, machine vision systems, vehicle navigation systems, video telephones, surveillance systems, auto focus systems, star tracker systems, motion detection systems, image stabilization systems, and others.

It is again noted that the above description and drawings illustrate representative embodiments in which the present invention can be practiced. Accordingly, the present invention is not limited by the foregoing description or drawings, but is only limited by the scope of the appended claims.

What is claimed as new and desired to be protected by Letters Patent of the United States is:

1. A method of operating an imaging device, the method comprising:
    selecting an output signal for a pixel of a pixel array from a plurality of possible output signals for said pixel for a single frame capture period, each of said plurality of possible output signals corresponding to a respective set of operating conditions in a pixel signal acquisition and processing path, each set of operating conditions capable of providing a different pixel signal for output for said single frame capture period, wherein respective sets of operating conditions are provided by:
        different photosensors within said pixel each providing pixel signals during at least two different photosensor integration periods, wherein the different photosensors include a photosensor for integrating charge and a floating diffusion region for integrating charge; and
    using the selected output signal to determine a corresponding image pixel output signal of the pixel for said single frame capture period.

2. The method of claim 1 wherein the output signals provided by the sets of operating conditions are used to provide an image output signal response curve for the pixel.

3. The method of claim 2 wherein the response curve approximates a logarithmic response curve.

4. The method of claim 2 wherein the response curve approximates a linear response curve.

5. The method of claim 1 wherein the selection is based on a pre-established signal selection criteria which includes a comparison of an amplified pixel signal to a threshold value.

6. The method of claim 1 wherein a first set of operating conditions includes operating a photosensor of the pixel for a first integration period and a second set of operating conditions includes operating the photosensor for a second integration period different from the first integration period.

7. A method of operating an imaging device, the method comprising:
    selecting an output signal for a pixel of a pixel array from a plurality of possible output signals for said pixel for a single frame capture period, each of said plurality of possible output signals corresponding to a respective set of operating conditions in a pixel signal acquisition and processing path, each set of operating conditions capable of providing a different pixel signal for output for said single frame capture period; and
    using the selected output signal to determine a corresponding image pixel output signal for the pixel,
    wherein a first set of operating conditions includes operating a photosensor of the pixel for a first integration period and a second set of operating conditions includes operating the photosensor for a second integration period different from the first integration period,
    wherein the first and second integration periods are provided through a rolling shutter readout of a pixel array using at least at least a reset row pointer and at least one readout row pointer.

8. The method of claim 7 wherein the rolling shutter readout comprises:
    resetting all pixel rows of a pixel array by rolling the reset row pointer;
    continually accumulating charge in all pixels in rows that are not addressed by the reset row pointer;
    sampling all pixels in a row after a first integration time as addressed by a readout row pointer; and
    sampling all pixels in a row after a second integration time as addressed a second time by a readout row pointer subsequent to the readout row pointer having selected at least one other row for readout.

9. The method of claim 8 wherein the readouts for the first and second integration times are initiated by a single readout row pointer.

10. A method of operating an imaging device, the method comprising:
    selecting an output signal for a pixel of a pixel array from a plurality of possible output signals for said pixel for a single frame capture period, each of said plurality of possible output signals corresponding to a respective set of operating conditions in a pixel signal acquisition and processing path, each set of operating conditions capable of providing a different pixel signal for output for said single frame capture period; and
    using the selected output signal to determine a corresponding image pixel output signal for the pixel,
    wherein a first set of operating conditions includes operating a photosensor of the pixel for a first integration period and a second set of operating conditions includes operating the photosensor for a second integration period different from the first integration period,
    wherein each pixel has a photosensor for integrating charge and a floating diffusion region for integrating charge and the plurality of possible pixel output signals comprises a photosensor output signal for each of the first and second integration periods and a floating diffusion region output signal for each of the first and second integration periods.

11. The method as in claim 10 further comprising selectively applying one of a plurality of gains to each of the photosensor and floating diffusion region output signals at each of the first and second integration periods.

12. The method as in claim 11, wherein the selection is based on a pre-established signal selection criteria which includes a comparison of an amplified pixel signal to a threshold value, and wherein the selection criteria selects one of the photosensor and floating diffusion region output signals, at one of the first and second integration times, with one of the plurality of gains, for use in determining the image pixel output signals.

13. The method of claim 12 wherein the plurality of possible pixel output signals comprises:
    a photosensor signal at a first integration time and with a first gain applied thereto;
    a photosensor signal at the first integration time and with a second gain applied thereto;
    a floating diffusion region signal at the first integration time and with the first gain applied thereto;
    a floating diffusion region signal at the first integration time and with the second gain applied thereto;
    a photosensor signal at a second integration time and with the first gain applied thereto;
    a photosensor signal at the second integration time and with the second gain applied thereto;
    a floating diffusion region signal at the second integration time and with the first gain applied thereto; and
    a floating diffusion region signal at the second integration time and with the second gain applied thereto;
    wherein the first and second integration times are different and the first and second gains are different.

14. The method of claim 13 wherein the selection is made in accordance with a criteria which selects one of the photosensor signal and the floating diffusion region signal according to whether at least one of the photosensor signal and the floating diffusion region signal provides a non-saturated signal as the selected signal.

15. The method of claim 13 wherein the photosensor signal and the floating diffusion region signal each correspond to a respective linear response curve for the pixel which saturates at a different level of illumination, and a combination of the linear response curves provides an appropriately logarithmic overall response curve for the pixel.

16. The method of claim 13 wherein the photosensor signal and the floating diffusion region signal each correspond to a respective linear response curve for the pixel which saturates at a different level of illumination, and an appropriately linear overall response curve for the pixel is provided based on the linear response curves.

17. The method of claim 1 wherein one of the operating conditions includes, as a part thereof, accumulating charge at a first photosensor of the pixel during a first integration period during said single frame capture period, and another of the operating conditions includes, as a part thereof, accumulating charge at the first photosensor during a second integration period during said single frame capture period.

18. The method of claim 17 wherein another of the operating conditions includes, as a part thereof, accumulating charge at a second photosensor of the pixel during the first integration period, and another of the operating conditions includes, as a part thereof, accumulating charge in the second photosensor during the second integration period.

19. The method of claim 17 wherein one of the operating conditions includes applying a first gain to a signal produced in response to accumulated charge at the first photosensor during the first integration period and another of the operating conditions includes applying a second gain to a signal produced in response to accumulated charge at the first photosensor during the first integration period.

20. The method of claim 19 wherein one of the operating conditions includes applying the first gain to a signal produced in response to the accumulated charge at the first photosensor during the second integration period and another of the operating conditions includes applying the second gain to a signal produced in response to the accumulated charge at the first photosensor during the second integration period.

21. The method of claim 18 wherein one of the operating conditions includes applying a first gain to a signal produced in response to the accumulated charge at the second photosensor during the first integration period and another of the operating conditions includes applying a second gain to a signal produced in response to accumulated charge at the second photosensor during the first integration period.

22. The method of claim 21 wherein one of the operating conditions includes applying a first gain to a signal produced in response to accumulated charge at the second photosensor during the second integration period and another of the operating conditions includes applying the second photosensor to a signal produced in response to accumulated charge at the second photosensor during the second integration period.

23. The method of claim 1 wherein one of the operating conditions includes, as a part thereof, accumulating charge at a first photosensor, and another of the operating conditions includes, as a part thereof, accumulating charge at said floating diffusion region.

24. The method of claim 23 wherein charges accumulate simultaneously in the first photosensor and the floating diffusion region.

25. The method of claim 24 wherein the selected output signal is a signal based on one of a charge accumulated by the first photosensor and a charge accumulated by the floating diffusion region.

26. The method of claim 23 wherein the first photosensor is a pinned photodiode.

27. The method of claim 26 further comprising reading out a photodiode output signal from said pinned photodiode using correlated double sampling.

28. The method of claim 26 further comprising reading out a floating diffusion output signal from said floating diffusion region using double delta sampling.

29. A method of operating an imaging device comprising:
acquiring and processing respective signals from at least two different photosensors within a pixel, wherein at least one of the photosensors is a floating diffusion region arranged to receive charge from another of the photosensors; and
controlling the acquisition and processing of the respective signals in a manner which produces signals corresponding to a plurality of possible individual illumination input versus signal output response curves which collectively form an overall appropriate logarithm illumination input versus signal output response curve for the pixel, wherein the controlling includes at least one of:
producing at least two pixel signals from each of the photosensors corresponding to different charge integration periods; and
producing at least one pixel signal from each of the photosensors which has a selected one of a plurality of possible gains applied thereto.

30. The method of claim 29 wherein the controlling produces at least two pixel signals from each of the photosensors corresponding to different charge integration periods.

31. The method of claim 29 wherein the controlling produces at least one pixel signal from each of the photosensors which has a selected one of a plurality of possible gains applied thereto.

32. The method of claim 30 wherein each of the at least two pixel signals has a selected one of a plurality of possible gains applied thereto.

33. A method of operating an image device, the method comprising:
acquiring and processing pixel signals from at least one photosensor within a pixel of the imager device; and
controlling the acquisition and processing of the pixel signals in a manner which produces at least two pixel signals from a first photosensor within the pixel respectively corresponding to different integration periods and in a manner which applies a selected one of a plurality of possible gains to each of the at least two pixel signals.

34. The method of claim 33 wherein the gain is selected in response to applying one of the gains to the pixel signal and comparing the results to a threshold value.

35. The method of claim 33 wherein the first photosensor comprises a photodiode of the pixel.

36. The method of claim 33 wherein the first photosensor comprises a floating diffusion region of the pixel, which is also arranged to receive charge from another photosensor of the pixel.

37. A method of operating an imaging device, the method comprising:
producing a first pixel signal of a pixel corresponding to charge accumulated at a first photosensor during a first charge integration period of a frame capture period;
selectively applying one of a first and second gain to the first pixel signal to produce a first amplified pixel signal;
producing a second pixel signal of the pixel corresponding to charge accumulated at the first photosensor during a second charge integration period of said frame capture period;

selectively applying one of the first and second gain to the second pixel signal to produce a second amplified pixel signal;
producing a third pixel signal of the pixel corresponding to charge accumulated at a second photosensor of the pixel during the first charge integration period;
selectively applying one of the first and second gain to the third pixel signal to produce a third amplified pixel signal;
producing a fourth pixel signal of the pixel corresponding to charge accumulated at the second photosensor during the second charge integration period;
selectively applying one of the first and second gain to the fourth pixel signal to produce a fourth amplified pixel signal; and
selecting one of the first through fourth amplified pixel signals as a signal used to represent an output of the pixel for said frame capture period.

38. The method of claim 37 wherein at least one of the selectively applying steps comprises:
applying a first gain to a pixel signal;
comparing the pixel signal with the gain applied to a threshold; and
selecting one of the first and second gains to be applied to the pixel signal in accordance with the result of the comparison.

39. The method of claim 37 wherein each of the selectively applying steps comprises:
applying a first gain to a pixel signal;
comparing the pixel signal with the gain applied to a threshold; and
selecting one of the first and second gains to be applied to the pixel signal in accordance with the result of the comparison.

40. The method of claim 37 further comprising analog-to-digitally converting the first through fourth amplified pixel signals.

41. The method of claim 40 wherein the selecting occurs after the analog-to-digital conversion of the first through fourth amplified pixel signals.

42. A method of operating an imaging device, the method comprising:
producing a first pixel signal of a pixel corresponding to charge accumulated at a first photosensor during a first charge integration period;
selectively applying one of a first and second gain to the first pixel signal to produce a first amplified pixel signal;
producing a second pixel signal of the pixel corresponding to charge accumulated at the first photosensor during a second charge integration period;
selectively applying one of the first and second gain to the second pixel signal to produce a second amplified pixel signal;
producing a third pixel signal of the pixel corresponding to charge accumulated at a second photosensor of the pixel during the first charge integration period;
selectively applying one of the first and second gain to the third pixel signal to produce a third amplified pixel signal;
producing a fourth pixel signal of the pixel corresponding to charge accumulated at the second photosensor during the second charge integration period;
selectively applying one of the first and second gain to the fourth pixel signal to produce a fourth amplified pixel signal;
analog-to-digitally converting the first through fourth amplified pixel signals;
selecting one of the first through fourth amplified pixel signals as a signal used to represent an output of the pixel, wherein the selecting occurs after the analog-to-digital conversion of the first through fourth amplified pixel signals, wherein the selecting further comprises:
determining if the first amplified pixel signal is saturated and, if so, temporarily storing the second amplified pixel signal and, if not saturated, temporarily storing the first amplified pixel signal;
determining if the third amplified pixel signal is saturated and, if so, using the fourth amplified pixel signal as the signal used to represent an output of the pixel and, if not, determining if the temporarily stored amplified signal is saturated and, if so, using the third amplified pixel signal as the signal used to represent an output of the pixel and, if not, using the temporarily stored pixel signal as the signal used to represent an output of the pixel.

43. An imaging apparatus comprising:
a pixel array; and
a readout circuit for the pixel array configured to:
select an output signal for a pixel of the pixel array from a plurality of possible output signals for the pixel of the array for a single frame capture period, the pixel comprising different photosensors including a photosensor for integrating charge and a floating diffusion region for integrating charge, each of the plurality of possible output signals corresponding to a respective set of operating conditions capable of providing a different pixel signal for output for said single frame capture period, wherein respective sets of operating conditions are provided by:
said different photosensors within said pixel each providing pixel signals during at least two different photosensor integration periods; and
use the selected output signal to determine a corresponding image pixel output signal of the pixel for said single frame capture period.

44. The apparatus of claim 43 wherein each set of operating conditions is associated with a respective segment of an image output signal response curve for the pixel.

45. The apparatus of claim 44 wherein the response curve approximates a logarithmic response curve.

46. The apparatus of claim 43 wherein the sets of operating conditions are used to provide a response curve which approximates a linear response curve.

47. The apparatus of claim 43 wherein the selection is based on a pre-established signal selection criteria which includes a comparison of an amplified pixel signal to a threshold value.

48. The apparatus of claim 43 wherein a first set of operating conditions includes operating a photosensor of the pixel for a first integration period and a second set of operating conditions includes operating the photosensor for a second integration period different from the first integration period.

49. An imaging apparatus comprising:
a pixel array; and
a readout circuit for the pixel array configured to:
select an output signal for a pixel of the pixel array from a plurality of possible output signals for the pixel of the array for a single frame capture period, each of the plurality of possible output signals corresponding to a respective set of operating conditions capable of providing a different pixel signal for output for said single frame capture period; and
using the selected output signal to determine a corresponding image pixel output signal for the pixel, wherein a first set of operating conditions includes operating a photosensor of the pixel for a first integration period and a second set of operating conditions includes operating the photosensor for a second integration period different from the first integration period, and wherein the first and second integration periods are provided through a rolling shutter readout by the readout circuit of a pixel array using at least a reset row pointer row spaced with at least one readout row pointer.

50. The apparatus of claim 49 wherein the readout circuit includes a readout controller which is configured to readout the pixel array by:

resetting all pixel rows of a pixel array by rolling the reset row pointer;

continually accumulating charge in all pixels in rows that are not addressed by the reset row pointer;

sampling all pixels in a row after a first integration time as addressed by a readout row pointer; and sampling all pixels in a row after a second integration time as addressed by a readout row pointer a second time subsequent to a readout row pointer having selected at least one other row for readout.

51. The apparatus of claim 50 wherein the readouts for the first and second integration times are initiated by a single readout row pointer.

52. An imaging apparatus comprising:
a pixel array; and
a readout circuit for the pixel array configured to:
select an output signal for a pixel of the pixel array from a plurality of possible output signals for the pixel of the array for a single frame capture period, each of the plurality of possible output signals corresponding to a respective set of operating conditions capable of providing a different pixel signal for output for said single frame capture period; and using the selected output signal to determine a corresponding image pixel output signal for the pixel, wherein a first set of operating conditions includes operating a photosensor of the pixel for a first integration period and a second set of operating conditions includes operating the photosensor for a second integration period different from the first integration period, and wherein each pixel has a photosensor for integrating charge and a floating diffusion region for integrating charge and the plurality of possible pixel output signals comprise a photosensor output signal for each of the first and second integration periods and a floating diffusion region output signal for each of the first and second integration periods.

53. The apparatus as in claim 52 wherein the readout circuit is configured to selectively apply one of a plurality of gains to each of photosensor and floating diffusion region output signals at each of the first and second integration periods.

54. The apparatus as in claim 53, wherein the selection is based on a pre-established signal selection criteria which includes a comparison of an amplified pixel signal to a threshold value, and wherein the readout circuit is configured to select one of the photosensor and floating diffusion region output signals, at one of the first and second integration times, with one of the plurality of gains, for use in determining the image pixel output signals.

55. The apparatus of claim 48 wherein the plurality of possible pixel output signals comprises:

a photosensor signal at a first integration time and with a first gain applied thereto;

a photosensor signal at the first integration time and with a second gain applied thereto;

a floating diffusion region signal at the first integration time and with the first gain applied thereto;

a floating diffusion region signal at the first integration time and with the second gain applied thereto;

a photosensor signal at a second integration time and with the first gain applied thereto;

a photosensor signal at the second integration time and with the second gain applied thereto;

a floating diffusion region signal at the second integration time and with the first gain applied thereto; and a floating diffusion region signal at the second integration time and with the second gain applied thereto;

wherein the first and second integration times are different and the first and second gains are different.

56. The apparatus of claim 55 wherein the readout circuit is configured to select one of the photosensor signal and the floating diffusion region signal according to whether at least one of the photosensor signal and the floating diffusion region signal provides a non-saturated signal as the selected signal.

57. The apparatus of claim 55 wherein the photosensor signal and the floating diffusion region signal each correspond to a respective linear response curve for the pixel which saturates at a different level of illumination, and the linear response curves are used to provide an overall response curve for the pixel.

58. The apparatus of claim 57 wherein the overall response curve is an approximately logarithmic response curve.

59. The apparatus of claim 57 wherein the overall response curve is an approximately linear response curve.

60. The apparatus of claim 43 wherein one of the operating conditions includes, as a part thereof, accumulating charge at a first photosensor of the pixel during a first integration period during said single frame capture period, and another of the operating conditions includes, as a part thereof, accumulating charge at the first photosensor during a second integration period during said single frame capture period.

61. The apparatus of claim 60 wherein another of the operating conditions includes, as a part thereof, accumulating charge at a second photosensor of the pixel during the first integration period, and another of the operating conditions includes, as a part thereof, accumulating charge in the second photosensor during the second integration period.

62. The apparatus of claim 60 wherein one of the operating conditions includes applying a first gain to a signal produced in response to accumulated charge at the first photosensor during the first integration period and another of the operating conditions includes applying a second gain to a signal produced in response to accumulated charge at the first photosensor during the first integration period.

63. The apparatus of claim 62 wherein one of the operating conditions includes applying the first gain to a signal produced in response to the accumulated charge at the first photosensor during the second integration period and another of the operating conditions includes applying the second gain to a signal produced in response to the accumulated charge at the first photosensor during the second integration period.

64. The apparatus of claim 61 wherein one of the operating conditions includes applying a first gain to a signal produced in response to the accumulated charge at the second photosensor during the first integration period and another of the operating conditions includes applying a second gain to a signal produced in response to accumulated charge at the second photosensor during the first integration period.

65. The apparatus of claim 64 wherein one of the operating conditions includes applying a first gain to a signal produced in response to accumulated charge at the second photosensor during the second integration period and another of the operating conditions includes applying the second photosensor to a signal produced in response to accumulated charge at the second photosensor during the second integration period.

66. The apparatus of claim 43 wherein one of the operating conditions includes, as a part thereof, accumulating charge at said first photosensor, and another of the operating conditions includes, as a part thereof, accumulating charge at said floating diffusion region.

67. The apparatus of claim 66 wherein charges accumulate simultaneously in the first photosensor and floating diffusion region.

68. The apparatus of claim 67 wherein the selected output signal is a signal based on one of a charge accumulated by the first photosensor and a charge accumulated by the floating diffusion region.

69. The apparatus of claim 66 wherein the first photosensor is a pinned photodiode.

70. The apparatus of claim 69 wherein the readout circuit reads out a photodiode output signal from said pinned photodiode using correlated double sampling.

71. The apparatus of claim 69 wherein the readout circuit reads out a floating diffusion output signal from said floating diffusion region using double delta sampling.

72. The apparatus as in claim 43 wherein the readout circuit comprises:
a first signal path for reading out two first photosensor signals respectively corresponding to charges accumulated by said first photosensor during at least a first and second integration period, the first signal path including a first amplifier stage for selectively applying one of a plurality of gains to each of the first photosensor readout signals; and
a second signal path for reading out two second photosensor signals respectively corresponding to charges accumulated by said floating diffusion region during the at least first and second integration periods, the second signal path including a second amplifier stage for selectively applying one of the plurality of gains to each of the second photosensor readout signals.

73. The apparatus of claim 72 wherein each of the first and second amplifier stages is configured to amplify a respective input signal, compare the amplified signal to a threshold, and select a final gain based on a result of the comparison.

74. The apparatus as in claim 73 wherein the readout circuit further comprises a first and second analog-to-digital converter for respectively digitizing the signals provided by the first and second amplifier stages using the final gain, the signals provided by the first and second amplifier stages, including said first and second photosensor signals, corresponding to each of the integration periods, with the final gain applied.

75. The apparatus as in claim 74 wherein the readout circuit further comprises a logic circuit coupled to at least one of the first and second signal paths for selecting one of the output signals of the first and second analog-to-digital converters for further processing.

76. An apparatus as in claim 75 wherein the logic circuit selects one of the signals provided by the first and second amplifier stages as the signals used to determine a corresponding image pixel output signal.

77. An imaging apparatus comprising:
a pixel array; and
a readout circuit for the pixel array configured to:
select an output signal for a pixel of the pixel array from a plurality of possible output signals for the pixel of the array for a single frame capture period, each of the plurality of possible output signals corresponding to a respective set of operating conditions capable of providing a different pixel signal for output for said single frame capture period; and
using the selected output signal to determine a corresponding image pixel output signal for the pixel,
wherein pixel comprises first and second photosensors and the readout circuit comprises:
a first signal path for reading out two first photosensor signals respectively corresponding to charges accumulated during at least a first and second integration period, the first signal path including a first amplifier stage for selectively applying one of a plurality of gains to each of the first photosensor readout signals;
a second signal path for reading out two second photosensor signals respectively corresponding to charges accumulated during the at least first and second integration periods, the second signal path including a second amplifier stage for selectively applying one of the plurality of gains to each of the second photosensor readout signals,
wherein each of the first and second amplifier stages is configured to amplify a respective input signal, compare the amplified signal to a threshold, and select a final gain based on a result of the comparison;
a first and second analog-to-digital converter for respectively digitizing the signals provided by the first and second amplifier stages using the final gain, the signals provided by the first and second amplifier stages, including signals from each of the photosensors, corresponding to each of the integration periods, with the final gain applied;
a logic circuit coupled to at least one of the first and second signal paths for selecting one of the output signals of the first and second analog-to-digital converters for further processing, wherein the logic circuit selects one of the signals provided by the first and second amplifier stages as the signals used to determine a corresponding image pixel output signal; and
a mapping circuit for receiving the selected signals and providing the image pixel output signal.

78. An apparatus as in claim 43 wherein the imaging apparatus comprises a digital camera.

79. An imaging apparatus comprising:
a pixel array; and
a readout circuit for:
acquiring and processing respective signals from at least two different photosensors within a pixel of the array, wherein at least one of the photosensors is a floating diffusion region arranged to receive charge from another of the photosensors, each of said signals corresponding to two different charge integration periods for each of the photosensors; and
controlling the acquisition and processing of the respective signals in a manner which produces a plurality of possible signals corresponding to a plurality of possible individual illumination input versus signal output response curves which collectively form an overall illumination input versus signal output response curve for the pixel.

80. The apparatus of claim 79 wherein the readout circuit produces pixel signals from each of the photosensors corresponding to each of the integration periods, each of the at least two pixel signals having a selected one of a plurality of possible gains applied thereto.

81. An image apparatus as in claim 80 wherein the imaging apparatus is a digital camera.

82. An imaging apparatus comprising
a pixel array; and
a readout circuit for the array, the readout circuit configured to:
acquire and process pixel signals from at least one photosensor within a pixel of the array; and
control the acquisition and processing in a manner which produces at least two pixel signals from a first photosensor within the pixel respectively corresponding to different integration periods and in a manner which applies a selected one of a plurality of possible gains to each of the at least two pixel signals.

83. The apparatus of claim 82 wherein the gain is selected in response to applying one of the gains to the pixel signal and comparing the results to a threshold value.

84. The apparatus of claim 82 wherein the first photosensor comprises a photodiode of the pixel.

85. The apparatus of claim 82 wherein the first photosensor comprises a floating diffusion region of the pixel, which is also arranged to receive charge from another photosensor of the pixel.

86. An imaging apparatus comprising:
a pixel array; and
a readout circuit for the pixel array, the readout circuit being configured to:
produce a first pixel signal of a pixel of the array corresponding to charge accumulated at a first photosensor during a first charge integration period of a frame capture period;
selectively apply one of a first and second gain to the first pixel signal to produce a first amplified pixel signal;
produce a second pixel signal of the pixel corresponding to charge accumulated at the first photosensor during a second charge integration period of said frame capture period;
selectively apply one of the first and second gain to the second pixel signal to produce a second amplified pixel signal;
produce a third pixel signal of the pixel corresponding to charge accumulated at a second photosensor of the pixel during the first charge integration period;
selectively apply one of the first and second gain to the third pixel signal to produce a third amplified pixel signal;
produce a fourth pixel signal of the pixel corresponding to charge accumulated at the second photosensor during the second charge integration period;
selectively apply one of the first and second gain to the fourth pixel signal to produce a fourth amplified pixel signal; and
select one of the first through fourth amplified pixel signals as a signal used to represent an output of the pixel for said frame capture period.

87. The apparatus of claim 86 wherein the readout circuit is configured, for each of the applying operations, to:
apply a first gain to a pixel signal;
compare the pixel signal with the gain applied to a threshold; and
select one of the first and second gains to be applied to the pixel signal in accordance with the results of the comparison.

88. The apparatus of claim 86 wherein the readout circuit includes an analog-to-digital converter for digitizing the first through fourth amplified pixel signals.

89. The apparatus of claim 88 wherein the selecting of the one of the first through fourth amplified pixel signals occurs after the analog-to-digital conversion.

90. An imaging apparatus comprising:
a pixel array; and
a readout circuit for the pixel array, the readout circuit being configured to:
produce a first pixel signal of a pixel of the array corresponding to charge accumulated at a first photosensor during a first charge integration period;
selectively apply one of a first and second gain to the first pixel signal to produce a first amplified pixel signal;
produce a second pixel signal of the pixel corresponding to charge accumulated at the first photosensor during a second charge integration period;
selectively apply one of the first and second gain to the second pixel signal to produce a second amplified pixel signal;
produce a third pixel signal of the pixel corresponding to charge accumulated at a second photosensor of the pixel during the first charge integration period;
selectively apply one of the first and second gain to the third pixel signal to produce a third amplified pixel signal;
produce a fourth pixel signal of the pixel corresponding to charge accumulated at the second photosensor during the second charge integration period;
selectively apply one of the first and second gain to the fourth pixel signal to produce a fourth amplified pixel signal; and
select one of the first through fourth amplified pixel signals as a signal used to represent an output of the pixel,
wherein the readout circuit includes an analog-to-digital converter for digitizing the first through fourth amplified pixel signals, and the selecting of the one of the first through fourth amplified pixel signals occurs after the analog-to-digital conversion, and
wherein the readout circuit is configured to select one of the first through fourth amplified pixel signals by:
determining if the first amplified pixel signal is saturated and, if so, temporarily storing the second amplified pixel signal and, if not saturated, temporarily storing the first amplified pixel signal; and
determining if the third amplified pixel signal is saturated and, if so, using the fourth amplified pixel signal as the signal used to represent an output of the pixel and, if not, determining if the temporarily stored amplified signal is saturated and, if so, using the third amplified pixel signal as the signal used to represent an output of the pixel and, if not, using the temporarily stored pixel signal as the signal used to represent an output of the pixel.

91. The method of claim 1 wherein one of the operating conditions includes, as a part thereof, applying a first gain to a signal produced in response to accumulated charge at the first photosensor and another of the operating conditions includes, as a part thereof, applying a second gain to the signal produced in response to the accumulated charge.

92. The apparatus of claim 43 wherein one of the operating conditions includes, as a part thereof, applying a first gain to a signal produced in response to accumulated charge at the first photosensor and another of the operating conditions includes, as a part thereof, applying a second gain to the signal produced in response to the accumulated charge.

* * * * *

UNITED STATES PATENT AND TRADEMARK OFFICE
CERTIFICATE OF CORRECTION

PATENT NO. : 8,115,841 B2  
APPLICATION NO. : 11/717065  
DATED : February 14, 2012  
INVENTOR(S) : Johannes Solhusvik Page 1 of 1

It is certified that error appears in the above-identified patent and that said Letters Patent is hereby corrected as shown below:

In column 11, line 56, in Claim 7, after "at least" delete "at least".

In column 21, line 3, in Claim 82, after "comprising" insert -- : --.

Signed and Sealed this
Third Day of April, 2012

David J. Kappos
*Director of the United States Patent and Trademark Office*